Dec. 19, 1933.     H. KLAUCKE     1,939,986

CHAIN LINK HOLDING DEVICE

Filed Feb. 3, 1932

Inventor
Herman Klaucke
By Attorneys

Patented Dec. 19, 1933

1,939,986

UNITED STATES PATENT OFFICE 1,939,986

CHAIN LINK HOLDING DEVICE

Hermann Klaucke, Worcester, Mass., assignor to Baldwin-Duckworth Chain Corporation, Worcester, Mass., a corporation of Massachusetts Application February 3, 1932. Serial No. 590,662

3 Claims. (Cl. 74—32)

The principal object of this invention is to provide a device for holding the chain links on their studs located on the link and of such a nature that it is not likely to be detached by the usage and wear of the chain.

The invention is particularly adapted for heavy and swiftly moving chains that do a great deal of service.

Other objects and advantages of the invention will appear hereinafter.

Reference is to be had to the accompanying drawing, in which

Figure 1:
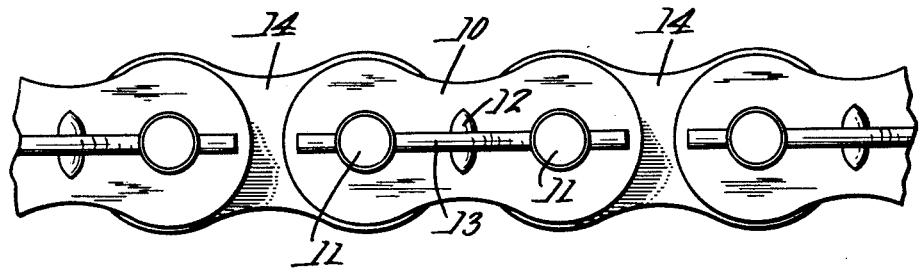
Fig. 1 is a side view of a chain constructed in accordance with the preferred embodiment of this invention applied thereto.
Figure 2:
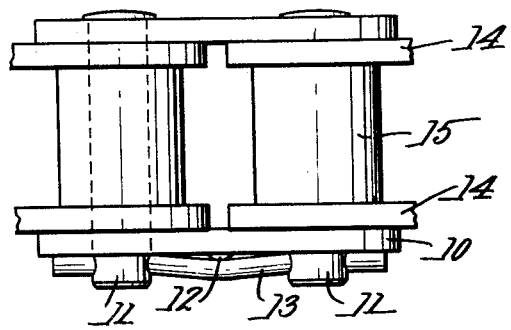
Fig. 2 is a plan of the same chain link.
Figure 4:
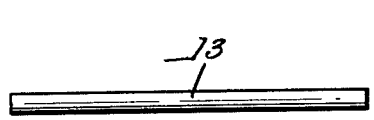
Fig. 4 is a side view of the holding means.
Figure 3:
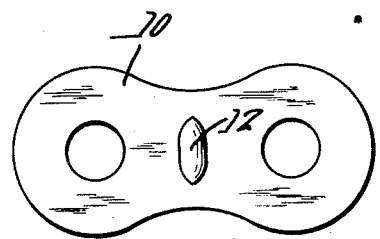
Fig. 3 is a side view of one of the links.

This invention relates to that type of chains in which the links 10 are connected by studs 11. The ordinary way of holding the studs in place is to head over one end and put a cotter pin through the other. These cotter pins are of soft metal so that they can be applied easily. The invention is designed for heavy chains which are subjected to very hard usage and high speed particularly. Under these conditions these cotter pins are bent and broken very easily and frequent interruptions to the service are necessary. Various expedients have been resorted to for the purpose of lessening or avoiding this difficulty, but they have not proved very practical.

With this invention the studs are perforated as usual and each link that comes on the outer side of the chain is provided in the manufacture with a boss 12 located half-way between the two holes through the link and extending beyond the surface of the link a short distance. The sides of this boss are slanted and preferably it is made on the arc of a circle for that purpose.

In order to hold the studs in position they are headed at one end as usual, and a pin 13 is formed of cylindrical or other shape and inserted through the holes in two adjacent studs as indicated in the drawing. This pin is made of soft steel which will enable it to be forced in, as indicated, to contact with the boss 12, and it has to be bent to get around this boss. Even if not bent the friction on the pin on the boss will hold the pin better than has been the case. For that reason it is difficult to remove it, and it is practically impossible for it to be removed by accident. When it is desired to remove it, the practical way is to cut it in two and take each end out through its own stud. The pins of the whole chain may be hardened after application, thus making it still more difficult to bend them to get them out. The boss, of course, bends the pin out at the center, so that even when cut in two it is not a particularly easy matter to get the ends out as they fit fairly snugly in the holes through the studs, though not with a driving fit.

This constitutes a means by which the studs are held in position even after long usage, and therefore cannot occasionally drop out by backing out through the opening through the inner link 14 and the valves 15 which separate the links. The construction is simple and the assembly not difficult, and whatever extra expense is entailed is fully justified when used on the kinds of chains above mentioned.

Although I have illustrated and described only a single form of the invention I am aware of the fact that changes can be made therein by any person skilled in the art without departing from the scope of the invention as expressed in the claims. Therefore I do not wish to be limited to the exact form shown, but what I do claim is:—

1. As an article of manufacture, a chain comprising links and studs passing through them, two studs having holes through them in alignment, an external link between the studs having a boss between the studs, and a pin extending through the two holes and in contact with the boss, whereby the pin is held in place by friction on the boss.

2. As an article of manufacture, a chain comprising links and pivotal studs passing through them, two adjacent studs having holes through them in alignment, an external link between the two studs having a boss between the studs, and a pin extending through the two holes and in contact with the boss, whereby the pin is bent out of a straight line between the two studs.

3. As an article of manufacture, a chain comprising links and studs passing through them to pivotally connect the links together, two adjacent studs of said chain having holes through them at one end in alignment with each other, the outer link connecting two studs having a projection at its center having inclined surfaces at its edges, and a hardened pin passing through the holes in the two adjacent studs and bent out of a straight line by said projection.

HERMANN KLAUCKE.